United States Patent
Nejadmalayeri et al.

(10) Patent No.: US 10,027,419 B2
(45) Date of Patent: Jul. 17, 2018

(54) POLARIZATION-CONTROLLED OPTICAL CHANNEL AND MEMORY DEVICE INCLUDING THE SAME

(71) Applicant: SAMSUNG ELECTRONICS CO., LTD., Suwon-si, Gyeonggi-Do (KR)

(72) Inventors: Amir Hossein Nejadmalayeri, Hwaseong-si (KR); Yoon-Dong Park, Osan-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 423 days.

(21) Appl. No.: 14/587,039

(22) Filed: Dec. 31, 2014

(65) Prior Publication Data

US 2015/0195044 A1    Jul. 9, 2015

(30) Foreign Application Priority Data

Jan. 7, 2014   (KR) ................ 10-2014-0001666

(51) Int. Cl.
*H04B 10/532*   (2013.01)
*H04B 10/278*   (2013.01)

(52) U.S. Cl.
CPC ......... *H04B 10/532* (2013.01); *H04B 10/278* (2013.01)

(58) Field of Classification Search
CPC .................. B01L 3/502753; H04L 5/14
See application file for complete search history.

(56) References Cited

U.S. PATENT DOCUMENTS

| | | | |
|---|---|---|---|
| 4,157,860 A | 6/1979 | Marcatili | |
| 4,384,760 A | 5/1983 | Alferness | |
| 4,400,052 A | 8/1983 | Alferness et al. | |
| 4,533,207 A | 8/1985 | Alferness | |
| 4,691,984 A | 9/1987 | Thanivavarn | |
| 4,697,868 A | 10/1987 | Thanivavarn | |
| 4,711,515 A | 12/1987 | Alferness | |
| 4,776,656 A | 10/1988 | Sanford et al. | |
| 4,889,402 A | 12/1989 | Reinhart | |
| 4,898,441 A | 2/1990 | Shimizu | |
| 4,966,431 A | 10/1990 | Heismann | |
| 5,056,883 A | 10/1991 | Diemeer et al. | |
| 5,111,517 A | 5/1992 | Riviere | |
| 5,117,469 A | 5/1992 | Cheung et al. | |
| 5,151,956 A | 9/1992 | Bloemer | |
| 5,218,653 A | 6/1993 | Johnson et al. | |

(Continued)

*Primary Examiner* — Thomas A Hollweg
*Assistant Examiner* — Erin Chiem
(74) *Attorney, Agent, or Firm* — Volentine, Whitt & Francos, PLLC

(57) ABSTRACT

A memory system includes a memory controller, a plurality of memory modules, and a memory bus connecting the memory controller and the plurality of memory modules. The memory bus includes at least one polarization-controlled optical channel configured to control a polarization of transmission light in response to a plurality of selection signals in order to transfer the transmission light to a target memory module among the plurality of memory modules. The transmission light is linearly-polarized light provided from the memory controller, and the plurality of selection signals correspond to the plurality of memory modules, respectively.

19 Claims, 11 Drawing Sheets

(56) References Cited

U.S. PATENT DOCUMENTS

| | | | |
|---|---|---|---|
| 5,253,309 A * | 10/1993 | Nazarathy | H04B 10/25 385/1 |
| 5,446,807 A | 8/1995 | Baran et al. | |
| 6,374,020 B1 | 4/2002 | Paniccia | |
| 6,466,705 B2 | 10/2002 | Tanaka et al. | |
| 6,590,695 B1 | 7/2003 | Kurtz et al. | |
| 6,707,595 B2 | 3/2004 | Kutz et al. | |
| 7,228,015 B2 | 6/2007 | Watts et al. | |
| 7,286,277 B2 | 10/2007 | Bloom et al. | |
| 7,411,807 B2 | 8/2008 | Taylor | |
| 7,505,640 B2 | 3/2009 | Little | |
| 7,551,453 B2 | 6/2009 | Bozso et al. | |
| 7,565,041 B2 | 7/2009 | Little et al. | |
| 7,702,188 B2 | 4/2010 | Little et al. | |
| 7,786,427 B2 | 8/2010 | Forrest et al. | |
| 7,787,715 B2 | 8/2010 | Kumatoriya | |
| 7,792,403 B1 | 9/2010 | Little et al. | |
| 7,907,338 B2 | 3/2011 | Bloom | |
| 7,925,168 B2 | 4/2011 | Tan et al. | |
| 7,941,056 B2 | 5/2011 | Baker et al. | |
| 8,094,978 B2 | 1/2012 | Tokushima | |
| 8,238,697 B2 | 8/2012 | Little et al. | |
| 2002/0146046 A1 * | 10/2002 | Kim | H01S 5/4006 372/20 |
| 2005/0174639 A1 * | 8/2005 | Zalevsky | G02B 6/272 359/484.06 |
| 2006/0114544 A1 | 6/2006 | Bloom et al. | |
| 2008/0181081 A1 | 7/2008 | Mayer et al. | |
| 2009/0304389 A1 | 12/2009 | Joe et al. | |
| 2011/0206381 A1 * | 8/2011 | Ji | H04J 14/08 398/140 |
| 2011/0268386 A1 | 11/2011 | Morris et al. | |
| 2011/0297851 A1 | 12/2011 | Lauer et al. | |
| 2012/0093459 A1 | 4/2012 | Mathai et al. | |
| 2012/0203957 A1 | 8/2012 | Schuette | |
| 2013/0058607 A1 * | 3/2013 | Binkert | G02B 6/43 385/16 |

* cited by examiner

POLARIZATION-CONTROLLED OPTICAL CHANNEL AND MEMORY DEVICE INCLUDING THE SAME

CROSS-REFERENCE TO RELATED APPLICATION

A claim of priority under 35 USC § 119 is made to Korean Patent Application No. 10-2014-0001666, filed on Jan. 7, 2014, in the Korean Intellectual Property Office (KIM), the disclosure of which is incorporated by reference in its entirety herein.

BACKGROUND

Example embodiments relate generally to optical communication, and more particularly to a polarization-controlled optical channel and to a memory system including a polarization-controlled optical channel.

As operational speeds of semiconductor devices are increased, an operational speed of a bus connecting the semiconductor devices must also be increased to support the high-speed semiconductor devices. For example, it has been necessary to increase the operational speed of a memory bus connected between a high-speed memory controller and a high speed memory device. When the memory bus is implemented with electrical channels, undesired results such as signal distortion, noise, delay, etc. may be serious, and thus reliability of the memory bus may be degraded at desired high operational speeds.

To overcome the limits of electrical channels, optical communication bus systems employing optical channels are under development. Optical communication bus systems may allow for increased data transfer speeds and reliability since optical signals suffer less from interference than electrical signals. Generally, in an optical communication bus system, a plurality of memory modules are coupled to an optical memory bus in order to communicate with a memory controller. In this configuration, power of the transmission signal from the memory controller may be distributed to the memory modules, and thus power consumption may be relatively high.

SUMMARY

According to example embodiments, a memory system includes a memory controller, a plurality of memory modules, and a memory bus connecting the memory controller and the memory modules. The memory bus includes at least one polarization-controlled optical channel configured to control a polarization of transmission light in response to a plurality of selection signals in order to transfer the transmission light to a target memory module among the memory modules. The transmission light is linearly-polarized light provided from the memory controller, and the plurality of selection signals correspond to the plurality of memory modules, respectively.

The polarization-controlled optical channel may include an optical waveguide coupled to the memory controller, and a plurality of selectors sequentially inserted along the optical waveguide. The plurality of selectors receive the plurality of selection signals, respectively, and the plurality of selectors are coupled to the plurality of memory modules, respectively.

The one selection signal corresponding to the target memory module may be activated and the other selection signals may be deactivated.

Each of the plurality of selectors may include a polarization controller and a polarization beam splitter. The polarization controller may control the polarization of the transmission light in response to the received selection signal. The polarization beam splitter may transfer the transmission light from the polarization controller selectively to the next selector or the corresponding memory module depending on the polarization of the transmission light from the polarization controller.

The polarization controller may rotate an original polarization of the transmission light by 90 degrees to output the transmission light having a rotated polarization when the received selection signal is activated, and maintain the original polarization of the transmission light to output the transmission light having the original polarization when the received selection signal is deactivated.

The polarization beam splitter may include a polarization prism configured to reflect the transmission light when the polarization of the transmission light from the polarization controller is orthogonal to the original polarization of the transmission light, and configured to pass the transmission light when the polarization of the transmission light from the polarization controller is parallel with the original polarization of the transmission light.

Each of the plurality of selectors may transfer entire power of the transmission light selectively to the next selector or the corresponding memory module without dividing the entire power of the transmission light.

The polarization-controlled optical channel may perform bidirectional communication between the memory controller and the memory modules.

Each of the plurality of memory modules may include an input-output polarization beam splitter, an internal optical waveguide connecting the input-output polarization beam splitter and the corresponding selector of the polarization-controlled optical channel, a photo-detector configured to receive the transmission light from the internal optical waveguide through the input-output polarization beam splitter, and a light source configured to transmit reception light to the internal optical waveguide through the input-output polarization beam splitter. The reception light is to be transferred to the memory controller.

The memory bus may include a data bus that is implemented with the polarization-controlled optical channel, and a command-address bus that is implemented with the polarization-controlled optical channel.

The plurality of selection signals may be transferred from the memory controller through a module selection channel that is distinct from the polarization-controlled optical channel.

The memory bus may include a data bus that is implemented with the polarization-controlled optical channel, and a command-address bus that is implemented with a broadcasting optical channel configured to transfer an optical signal simultaneously to the plurality of memory modules.

The plurality of selection signals may be transferred from the memory controller through the broadcasting optical channel.

The memory bus may include a data bus that is implemented with the polarization-controlled optical channel, and a command-address bus that is implemented with an electrical channel.

According to example embodiments, a polarization-controlled optical channel includes an optical waveguide and a plurality of selectors. The optical waveguide transfers transmission light to a plurality of slave devices, and the transmission light is linearly-polarized light provided from a host device. The plurality of selectors are sequentially inserted along the optical waveguide. The plurality of selectors control a polarization of the transmission light in response to a plurality of selection signals in order to transfer the transmission light to a target slave device among the plurality of slave devices. The plurality of selection signals correspond to the plurality of slave devices, respectively.

Each of the plurality of selectors may include a polarization controller configured to control the polarization of the transmission light in response to the received selection signal, and a polarization beam splitter configured to transfer the transmission light from the polarization controller selectively to the next selector or the corresponding slave device depending on the polarization of the transmission light from the polarization controller.

The polarization controller may rotate an original polarization of the transmission light by 90 degrees to output the transmission light having a rotated polarization when the received selection signal is activated, and maintain the original polarization of the transmission light to output the transmission light having the original polarization when the received selection signal is deactivated.

According to example embodiments, a portable device includes a processor including a memory controller, an input/output hub coupled to the processor, an input/output controller hub coupled to the input/output hub, at least one memory module, a memory bus disposed between the memory controller and the at least one memory, the memory bus including at least one polarization-controlled optical channel, and a graphics card. The at least one polarization-controlled optical channel is configured to control a polarization of transmission light and transfer the transmission light to a target memory module among the at least one memory module.

Each of the at least one memory module may include a plurality of memory devices, a buffer coupled to the plurality of memory devices, a plurality of internal channels, each of the plurality of internal channels including an internal optical waveguide, an input-output polarization beam splitter and a reflector, a light source configured to transmit reception light to the internal optical waveguide through the input-output polarization beam splitter, and a photo detector configured to receive the transmission light from the internal optical waveguide through the input-output polarization beam splitter. The reception light may be reflected by the input-output polarization beam splitter.

Each of the at least one memory module may include an interface that is configured to support bidirectional communication with the memory controller.

BRIEF DESCRIPTION OF THE DRAWINGS

Example embodiments will be more clearly understood from the detailed description that follows taken in conjunction with the accompanying drawings.

DETAILED DESCRIPTION OF THE EMBODIMENTS

Figure 1:
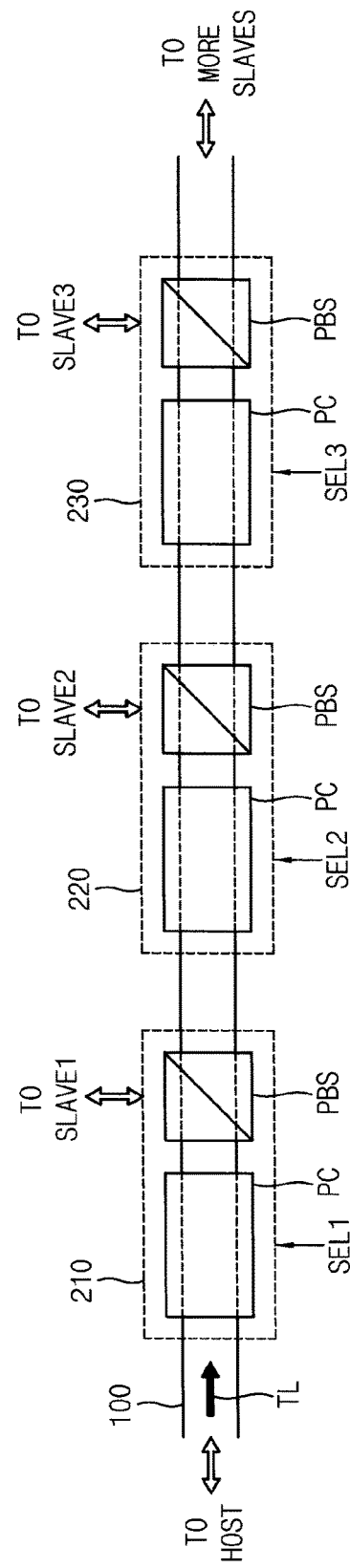
FIG. 1 is a diagram illustrating a polarization-controlled optical channel according to example embodiments.

Various example embodiments will be described more fully hereinafter with reference to the accompanying drawings, in which some example embodiments are shown. The inventive concepts may, however, be embodied in many different forms and should not be construed as limited to the example embodiments set forth herein. Rather, these example embodiments are provided so that this disclosure will be thorough and complete, and will fully convey the scope of the inventive concepts to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a diagram illustrating a polarization-controlled optical channel according to example embodiments.

Referring to FIG. 1, a polarization-controlled optical channel 10 includes an optical waveguide 100 and a plurality of selectors 210, 220 and 230.

The optical waveguide 100 transfers transmission light TL to a plurality of slave devices SLAVE1, SLAVE2 and SLAVE3. The transmission light TL is linearly-polarized light provided from a host device HOST. The optical waveguide 100 may be implemented using various methods. For example, the optical waveguide 100 may be an indivisible structure that is formed on or in a printed circuit board, or may be an independent structure such as an optical fiber. The optical waveguide 100 may be formed of polymer or dielectric material. The optical waveguide 100 may also be a hollow metal pipe. The cross-section of the optical waveguide 100 may be a square, a rectangle, a circle, an ellipse or an arbitrary shape for guiding optical signals.

The selectors 210, 220 and 230 may be sequentially inserted along the optical waveguide 100. The selectors 210, 220 and 230 may control a polarization of the transmission light TL in response to a plurality of selection signals SEL1, SEL2 and SEL3 in order to transfer the transmission light TL to a target slave device among the slave devices SLAVE1, SLAVE2 and SLAVE3. The selection signals SEL1, SEL2 and SEL3 correspond to the slave devices SLAVE1, SLAVE2 and SLAVE3, respectively. Even though FIG. 1 illustrates three selectors 210, 220 and 230 for convenience of illustration, the polarization-controlled optical channel may include two, four or more selectors, depending on the number of the slave devices.

Among the selection signals SEL1, SEL2 and SEL3, one selection signal corresponding to the target slave device is activated and the other selection signals are deactivated. When the first slave device SLAVE1 is the target device, the first selection signal SEL1 is activated and the other selection signals SEL2 and SEL3 are deactivated. When the second slave device SLAVE2 is the target device, the second selection signal SEL2 is activated and the other selection signals SEL1 and SEL3 are deactivated. When the third slave device SLAVE3 is the target device, the third selection signal SEL3 is activated and the other selection signals SEL1 and SEL2 are deactivated.

In an example embodiment, as illustrated in FIG. 1, each of the selectors 210, 220 and 230 may include a polarization controller PC and a polarization beam splitter PBS. The polarization controller PC may control the polarization of the transmission light TL in response to the received selection signal SELi (i=1, 2 or 3). The polarization beam splitter PBS may transfer the transmission light TL from the polarization controller PC selectively to the next selector or the corresponding slave device depending on the polarization of the transmission light TL from the polarization controller PC.

Hereinafter, for convenience description, a polarization perpendicular to a plane of incidence is referred to as a first polarization P1, which is represented as a dotted circle in the figures, and a polarization parallel with the plane of incidence is referred to as a second polarization P2, which is represented as a double arrow in the figures. Accordingly the first polarization P1 is orthogonal to the second polarization P2. The first polarization P1 may correspond to a transverse electric (TE) mode and the second polarization P2 may correspond to a transverse magnetic (TM) mode. Alternately, the first polarization P1 may correspond to the TM mode and the second polarization P2 may correspond to the TE mode.

Figure 2:
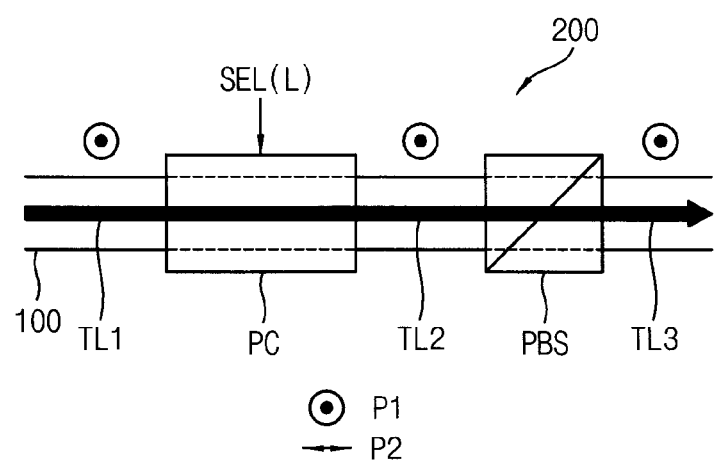
FIG. 2 is a diagram illustrating a penetrating operation of transmission light by a selector included in the polarization-controlled optical channel of FIG. 1.
Figure 3:
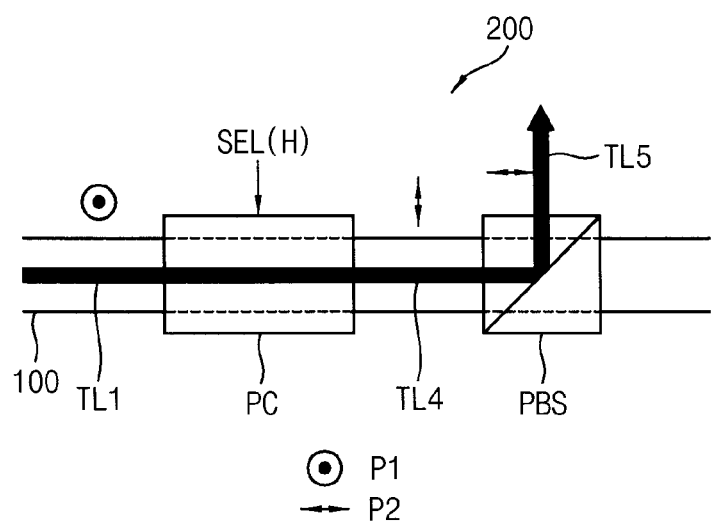
FIG. 3 is a diagram illustrating a reflecting operation of transmission light by a selector included in the polarization-controlled optical channel of FIG. 1.

FIG. 2 is a diagram illustrating a penetrating operation of transmission light by a selector included in the polarization-controlled optical channel of FIG. 1, and FIG. 3 is a diagram illustrating a reflecting operation of transmission light by the selector included in the polarization-controlled optical channel of FIG. 1.

Referring to FIGS. 2 and 3, each selector 200 may be implemented with a polarization controller PC and a polarization beam splitter PBS. The polarization controller PC may control the polarization of the transmission light TL1 in response to the received selection signal SEL and output the light having the controlled polarization. The polarization beam splitter PBS may transfer the transmission light TL2 or TL4 from the polarization controller PC selectively to the next selector or the corresponding slave device depending on the polarization of the transmission light TL2 or TL4 from the polarization controller PC.

The polarization controller PC may rotate an original polarization, that is, the first polarization P1 of the transmission light TL1, by 90 degrees to output the transmission light having a rotated polarization, that is, the second polarization P2, when the received selection signal SEL is activated, and maintain the original polarization of the transmission light TL1 to output the transmission light having the original polarization when the received selection signal is deactivated.

For example, as illustrated in FIGS. 2 and 3, the original polarization of the transmission light TL1 may be the first polarization P1, and the rotated polarization may be the second polarization P2 that is orthogonal to the first polarization P1. As illustrated in FIG. 2, when the received selection signal SEL is deactivated in the logic low level L, the polarization controller PC may not change the first polarization P1 of the transmission light TL1 and may output the transmission light TL2 having the first polarization P1. As illustrated in FIG. 3, when the received selection signal SEL is activated in the logic high level H, the polarization controller PC may rotate the first polarization P1 of the transmission light TL1 by 90 degrees and may output the transmission light TL4 having the second polarization P2.

The polarization beam splitter PBS may reflect the transmission light when the polarization of the transmission light from the polarization controller PC is orthogonal to the original polarization of the transmission light. In contrast, the polarization beam splitter PBS may pass the transmission light when the polarization of the transmission light transferred from the polarization controller PC is the same as the original polarization of the transmission light.

As illustrated in FIG. 2, the polarization beam splitter PBS may pass the transmission light TL2 transferred from the polarization controller PC when the polarization of the transmission light TL2 is the same as the original polarization P1. The passed transmission light TL3 having the first polarization P1 is transferred to the next selector.

As illustrated in FIG. 3, the polarization beam splitter PBS may reflect the transmission light TL4 transferred from the polarization controller PC when the polarization of the transmission light TL4 is orthogonal to the original polarization P1. The reflected transmission light TL5 having the second polarization P2 is transferred to the corresponding slave device.

As such, each selector 200 may transfer entire power of the transmission light TL1 selectively to the next selector or the corresponding slave device without dividing the entire power of the transmission light TL1. In other words, if the loss along the transfer path is neglected, the power of the transmission light TL1 that is input to the selector 200, the power of the passed transmission light TL3 and the power of the reflected transmission light TL5 may be substantially the same.

Figure 4:
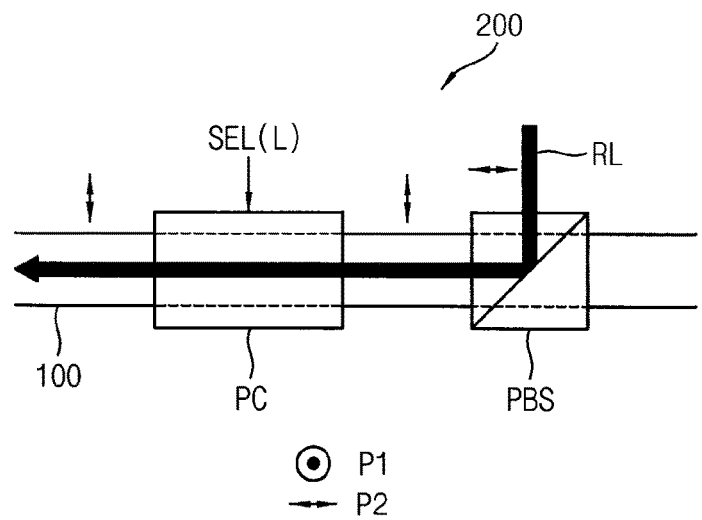
FIG. 4 is a diagram illustrating a reflecting operation of reception light by a selector included in the polarization-controlled optical channel of FIG. 1.

FIG. 4 is a diagram illustrating a reflecting operation of reception light by a selector included in the polarization-controlled optical channel of FIG. 1.

The polarization-controlled optical channel 10 as illustrated in FIG. 1 may perform bidirectional communication between the host device HOST such as a memory controller and the slave devices SLAVE1, SLAVE2 and SLAVE3 such as memory modules. In case of the bidirectional optical channel, the transmission light TL may be transferred from the host device to the corresponding slave device as illustrated in FIG. 3, and the reception light RL may also be transferred from the corresponding slave device to the host device as illustrated in FIG. 4.

For example, the selector 200 may pass the incident light having the first polarization P1 and reflect the incident light having the second polarization P2 as illustrated in FIGS. 2 and 3. In this case, the slave device may generate and output the reception light RL having the second polarization P2 in order to transfer the entire power of the reception light RL to the host device without dividing the power of the reception light RL, as illustrated in FIG. 4.

The polarization controller PC may be a lumped polarization controller or a distributed polarization controller. The lumped polarization controller is essentially bidirectional, and the polarization may be rotated by applying the activated selection signal SEL regardless of the propagating directions of the light. In case of the lumped polarization controller, the bidirectional transfers may not be performed simultaneously. and the selection signal SEL has to be deactivated in the logic low level L while the reception light RL is transferred from the slave device to the host device. In contrast, the distributed polarization controller is essentially unidirectional, and the polarization may be rotated by applying the selection signal SEL with respect to one propagating direction. In case of the distributed polarization controller, the bidirectional transfers may be performed simultaneously, and the selection signal SEL may be activated in the logic high level H for the transfer of the transmission light TL while the reception light RL is transferred from the slave device to the host device.

Figure 5:
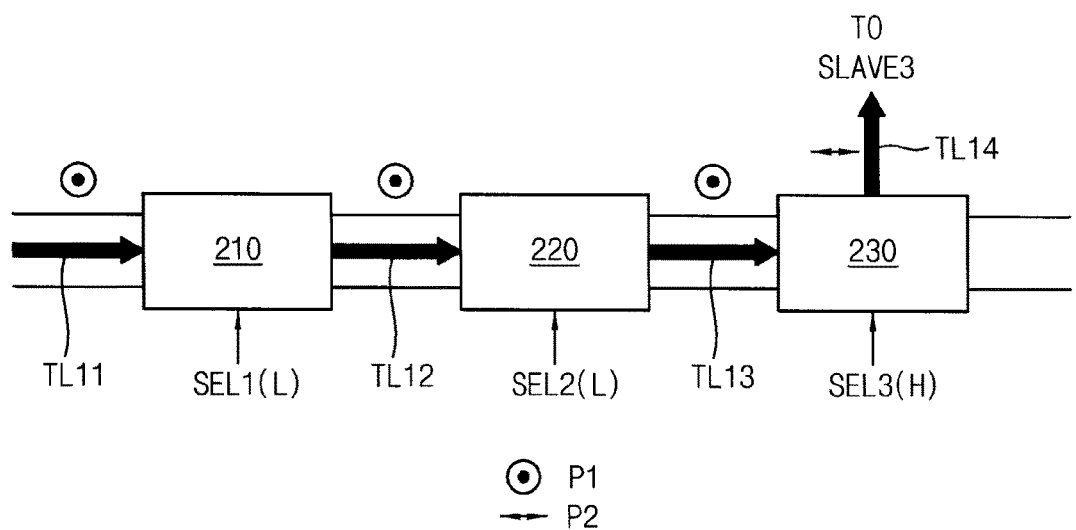
FIGS. 5 and 6 are diagrams illustrating example selecting operations of a polarization-controlled optical channel according to example embodiments.
Figure 6:
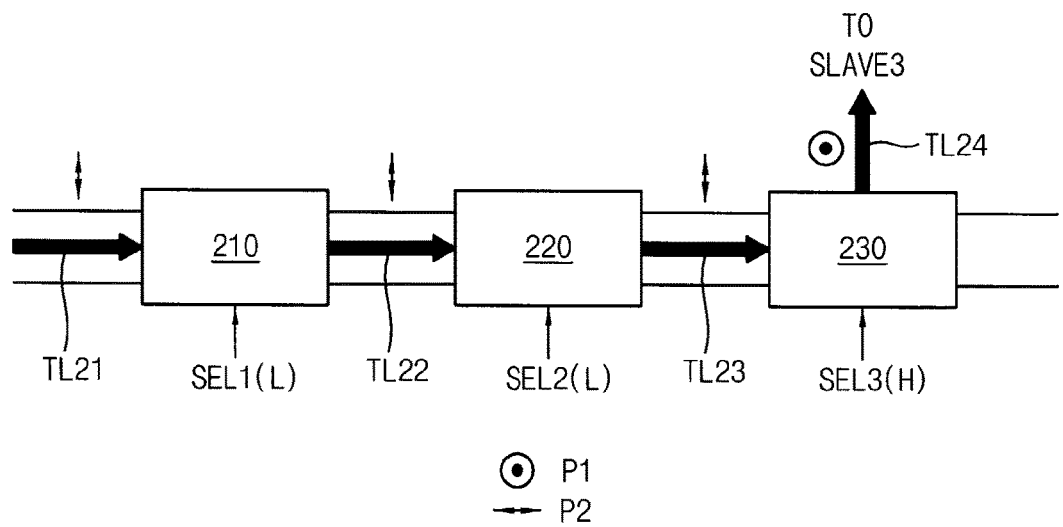

FIGS. 5 and 6 are diagrams illustrating example selecting operations of a polarization-controlled optical channel according to example embodiments.

FIG. 5 illustrates an example embodiment that the host device outputs transmission light TL11 having the first polarization P1, and FIG. 6 illustrates an example embodiment that the host device outputs transmission light TL21 having the second polarization P2. For example, the third slave device SLAVE3 corresponding to the third selector 230 may be selected as the target slave device as illustrated in FIGS. 5 and 6.

Referring to FIG. 5, the first selection signal SEL1 and the second selection signal SEL2 may be deactivated in the logic low level L, and the third selection signal SEL3 may be activated in the logic high level H. The first selector 210 and the second selector 220 may transfer the transmission light TL12 and TL13 having the first polarization P1 to the next selectors, respectively. The first polarization P1 is equal to the polarization of the transmission light TL11 from the host device. The third selector 230 may rotate the first polarization P1 of the transmission light TL13 by 90 degrees in order to transfer the transmission light TL14 having the second polarization P2 to the target slave device SLAVE3. For example, each of the selectors 210, 220 and 230 may include a polarization beam splitter PBS that passes the incident light having the first polarization P1 and reflects the incident light having the second polarization P2.

Referring to FIG. 6, the first selection signal SEL1 and the second selection signal SEL2 may be deactivated in the logic low level L, and the third selection signal SEL3 may be activated in the logic high level H. The first selector 210 and the second selector 220 may transfer the transmission lights TL22 and TL23 having the second polarization P2 to the next selectors, respectively. The second polarization P2 is equal to the polarization of the transmission light TL21 from the host device. The third selector 230 may rotate the second polarization P2 of the transmission light TL23 by 90 degrees in order to transfer the transmission light TL24 having the first polarization P1 to the target slave device SLAVE3. For example, each of the selectors 210, 220 and 230 may include a polarization beam splitter PBS that passes the incident light having the second polarization P2 and reflects the incident light having the first polarization P1.

The polarization-controlled optical channel according to example embodiments may reduce power consumption by performing point-to-point communication with the one selected slave device or the one selected memory module without dividing the power of the transmission light.

Figure 7:
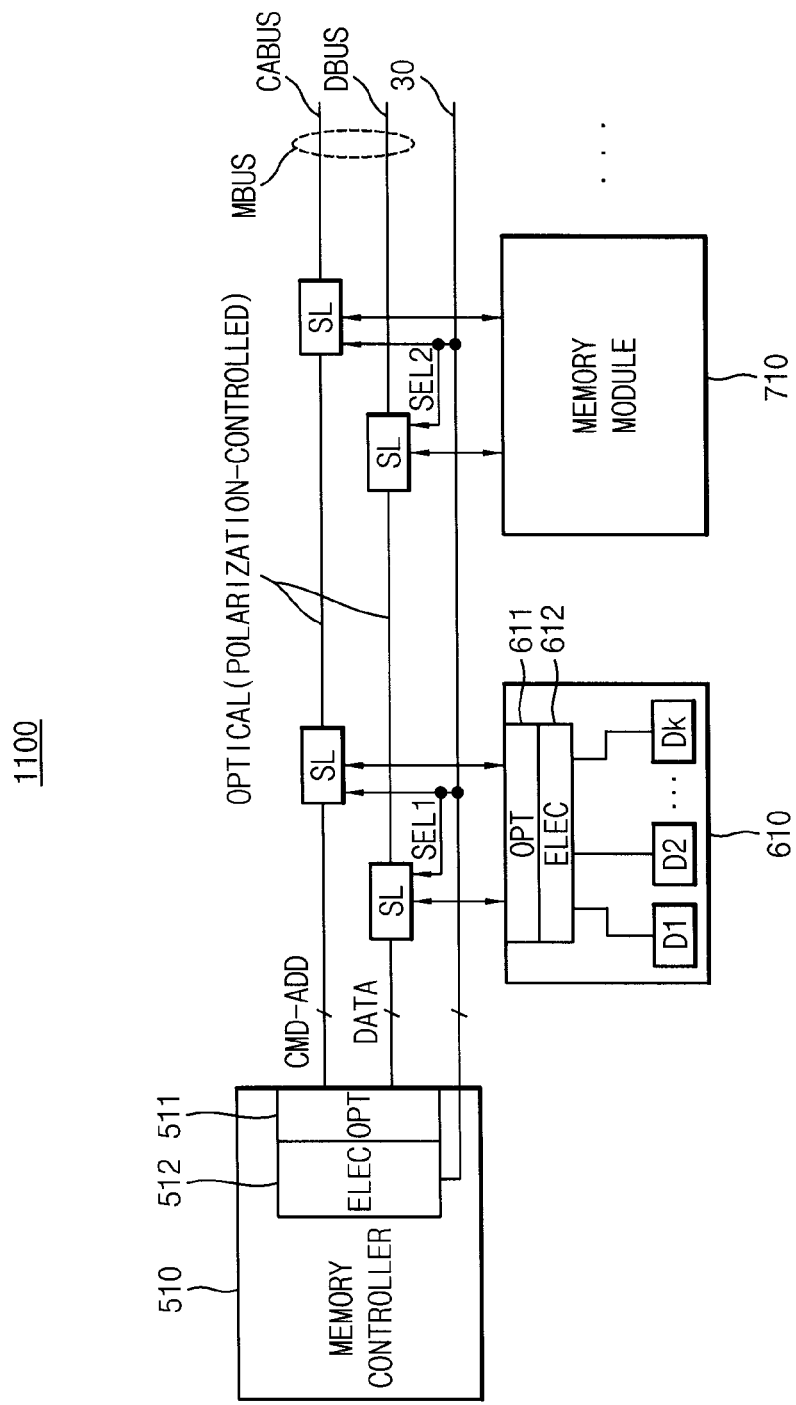
FIG. 7 is a block diagram illustrating a memory system including a memory bus according to an example embodiment.

FIG. 7 is a block diagram illustrating a memory system including a memory bus according to an example embodiment.

Referring to FIG. 7, a memory system 1100 includes a memory controller 510, a plurality of memory modules 610 and 710, and a memory bus MBUS connecting the memory controller 510 and the memory modules 610 and 710. The memory modules 610 and 710 may have substantially the same configuration.

The memory controller 510 and the memory module 610 may include optical interfaces (OPT) 511 and 611, and electrical interfaces (ELEC) 512 and 612, respectively. The memory module 610 may include a plurality of memory devices D1, D2, . . . Dk coupled to the electrical interface 612. The memory controller 510 and the memory module 610 may perform electrical-to-optical conversion (E/O) and optical-to-electrical conversion (O/E) using the respective optical interfaces 511 and 611. The optical interfaces 511 and 611 may include a photo-detector such as a photo-diode and a light source such as a laser.

The memory bus MBUS may include a data bus DBUS implemented with a polarization-controlled optical channel as described with reference to FIGS. 1 through 6, and a command-address bus CABUS implemented with the polarization-controlled optical channel. The command-address signal CMD-ADD and the data signal DATA transferred between the memory controller 510 and the memory modules 610 and 710 may be optical signals.

The polarization-controlled optical channel may control a polarization of transmission light in response to a plurality of selection signals SEL1 and SEL2 in order to transfer the transmission light to a target memory module among the memory modules 610 and 710. The transmission light is linearly-polarized light provided from the memory controller 510, and the selection signals SEL1 and SEL2 correspond to the memory modules 610 and 710, respectively. As described above, the polarization-controlled optical channel may include the optical waveguide coupled to the memory controller 510, and the selectors SL sequentially inserted along the optical waveguide. The selectors SL receive the selection signals SEL1 and SEL2, respectively, and the selectors SL are coupled to the memory modules 610 and 710, respectively.

In an example embodiment, the selection signals SEL1 and SEL2 may be provided from the memory controller 510 through a module selection channel 30 that is distinct from the polarization-controlled optical channel. The module selection channel 30 may be implemented with an electrical channel, and the module selection channel 30 may include electrical transmission lines corresponding to the number of selection signals SEL1 and SEL2. FIG. 7 illustrates a non-limiting example embodiment such that the selection signals SEL1 and SEL2 are provided directly to the respective selectors SL from the memory controller 510. In other example embodiments, the selection signals SEL1 and SEL2 may be provided to the respective memory modules 610 and 710, and the memory modules 610 and 710 may provide control voltages having proper voltage levels to the selectors SL in response to the selection signals SEL1 and SEL2.

Figure 8:
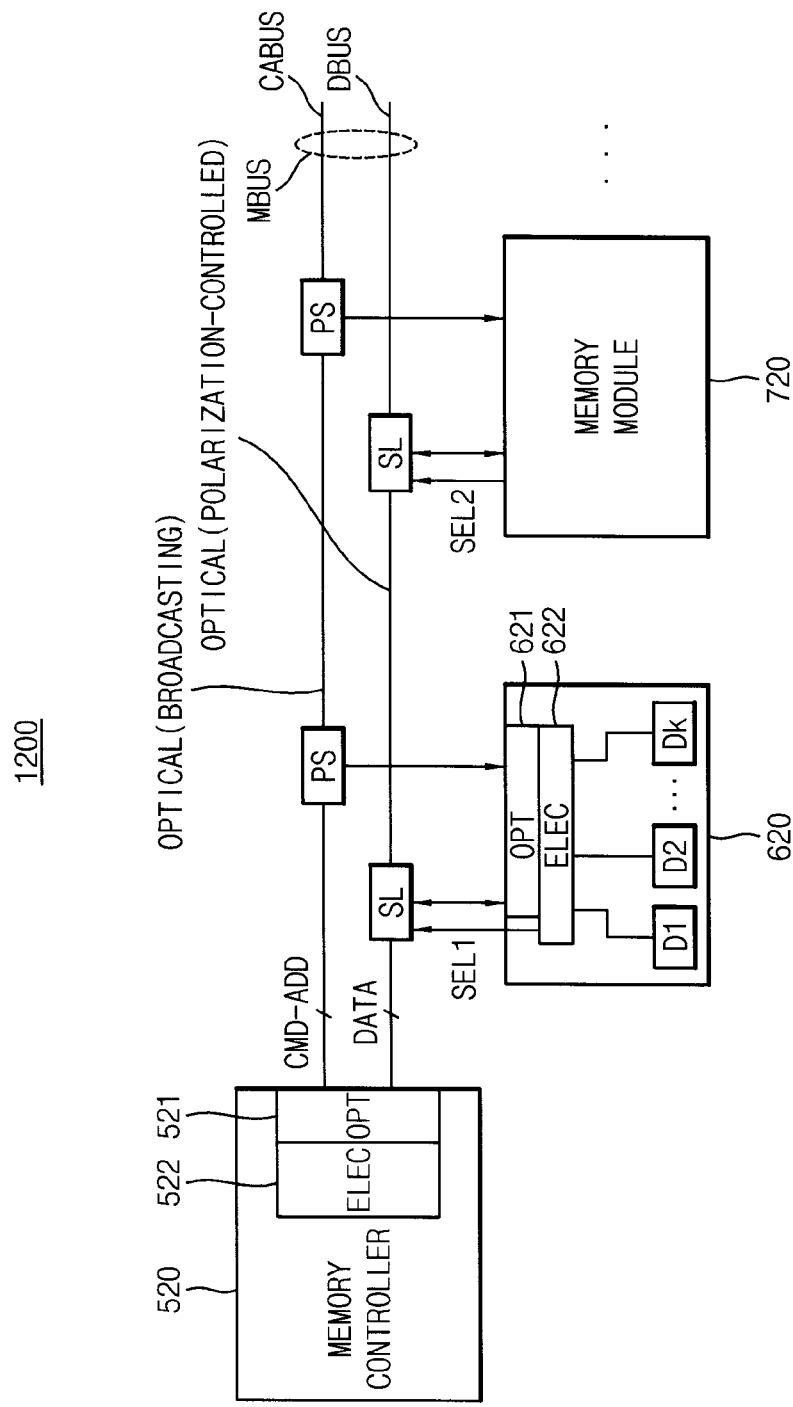
FIG. 8 is a block diagram illustrating a memory system including a memory bus according to another example embodiment.

FIG. 8 is a block diagram illustrating a memory system including a memory bus according to another example embodiment.

Referring to FIG. 8, a memory system 1200 includes a memory controller 520, a plurality of memory modules 620 and 720, and a memory bus MBUS connecting the memory controller 520 and the memory modules 620 and 720. The memory modules 620 and 720 may have substantially the same configuration.

The memory controller 520 and the memory module 620 may include optical interfaces (OPT) 521 and 621 and electrical interfaces (ELEC) 522 and 622, respectively. The memory module 620 may include a plurality of memory devices D1, D2, . . . Dk coupled to the electrical interface 622.

The memory bus MBUS may include a data bus DBUS implemented with a polarization-controlled optical channel as described with reference to FIGS. 1 through 6, and a command-address bus CABUS implemented with a broadcasting optical channel. The command-address signal CMD-ADD and the data signal DATA transferred between the memory controller 520 and the memory modules 620 and 720 may be optical signals.

The polarization-controlled optical channel may control a polarization of transmission light in response to a plurality of selection signals SEL1 and SEL2 in order to transfer the transmission light to a target memory module among the memory modules 620 and 720. The transmission light is linearly-polarized light provided from the memory controller 520, and the selection signals SEL1 and SEL2 correspond to the memory modules 620 and 720, respectively. As described above, the polarization-controlled optical channel may include the optical waveguide coupled to the memory controller 520, and the selectors SL sequentially inserted along the optical waveguide. The selectors SL receive the selection signals SEL1 and SEL2, respectively, and the selectors SL are coupled to the memory modules 620 and 720, respectively.

The broadcasting optical channel is configured to transfer an optical signal simultaneously to the memory modules 620 and 720. The polarization-controlled optical channel transfers the light signal from the memory controller 520 selectively to the target memory module among the memory modules 620 and 720. The broadcasting optical channel may include an optical waveguide and a plurality of power splitters PS sequentially inserted along the optical waveguide. The power splitters PS are coupled to the memory modules 620 and 720, respectively.

In an example embodiment, the selection signals SEL1 and SEL2 may be provided from the memory controller 520 through the broadcasting optical channel included in the command-address bus CABUS. For example, information on the selection signals SEL1 and SEL2 for selecting one memory module may be provided with an active command to the memory modules 620 and 720 through the broadcasting optical channel. After the one selector SL is selected or enabled in response to the selection signals SEL1 and SEL2, the write data may be provided with a write command from the memory controller 520 through the polarization-controlled optical channel.

Figure 9:
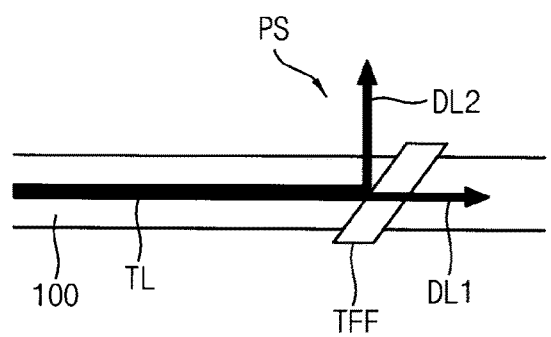
FIG. 9 is a diagram illustrating an operation of a power splitter included in the memory system of FIG. 8.

FIG. 9 is a diagram illustrating an operation of a power splitter included in the memory system of FIG. 8.

Referring to FIGS. 8 and 9, a power splitter PS may be implemented with a thin film filter TFT. The transmission light TL, which is transferred from the memory controller 520 through the optical waveguide 100, may be divided by the power splitter PS into passed light DL1 and reflected light DL2. In other words, a portion of the power of the transmission light TL is transferred to the next power splitter, and another portion of the power of the transmission light TL is transferred to the corresponding memory module. As such, the command-address signal CMD-ADD may be transferred simultaneously to the entire memory modules 620 and 720 by distributing the power of the transmission light TL using the power splitters PS. The power splitters are sequentially inserted along the optical waveguide 100, and are coupled to the memory modules 620 and 720, respectively.

Figure 10:
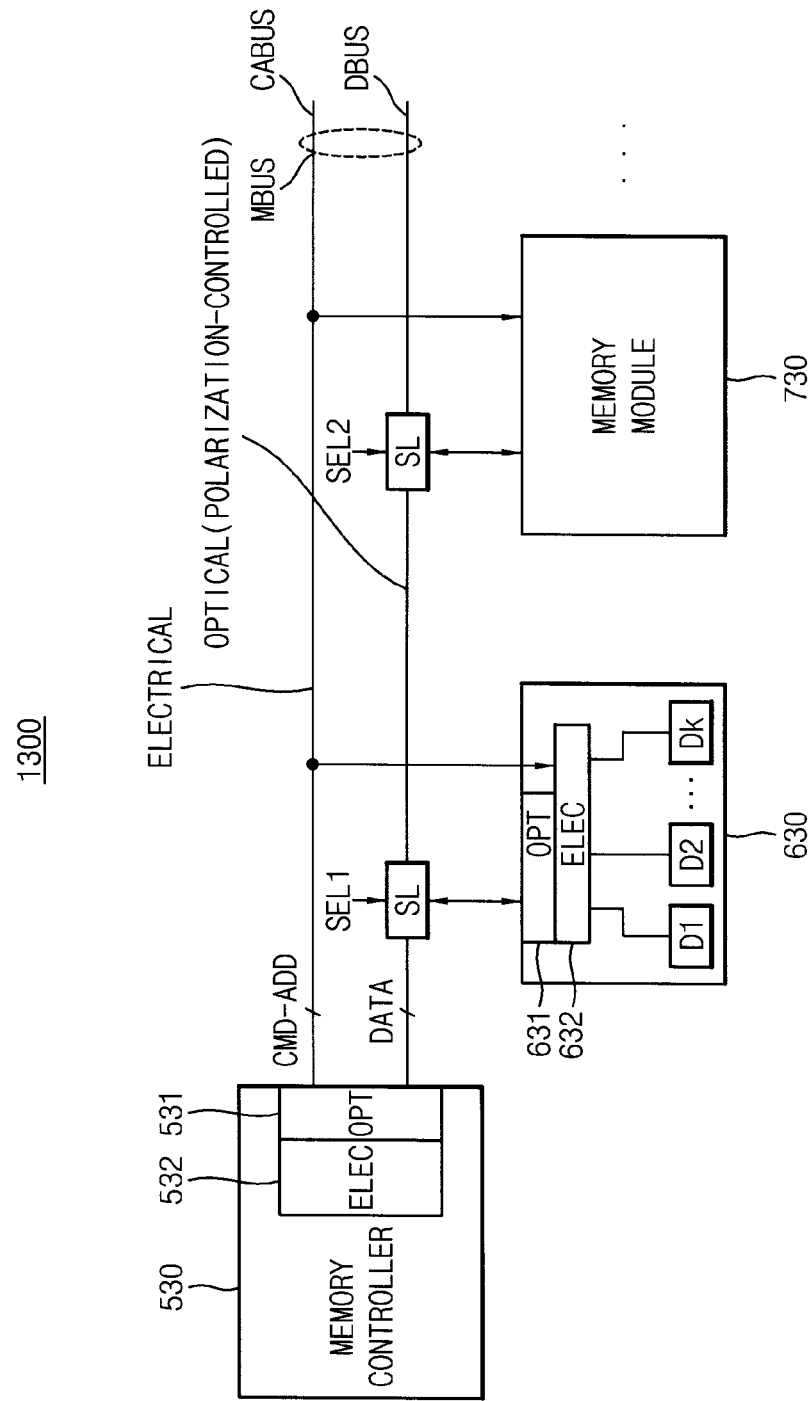
FIG. 10 is a block diagram including a memory bus according to still another example embodiment.

FIG. 10 is a block diagram including a memory bus according to still another example embodiment.

Referring to FIG. 10, a memory system 1300 includes a memory controller 530, a plurality of memory modules 630 and 730, and a memory bus MBUS connecting the memory controller 530 and the memory modules 630 and 730. The memory modules 630 and 730 may have substantially the same configuration.

The memory controller 530 and the memory module 630 may include optical interfaces (OPT) 531 and 631, and electrical interfaces (ELEC) 532 and 632, respectively. The memory module 630 may include a plurality of memory devices D1, D2, . . . Dk coupled to the electrical interface 632.

The memory bus MBUS may include a data bus DBUS implemented with a polarization-controlled optical channel as described with reference to FIGS. 1 through 6, and a command-address bus CABIS implemented with an electrical channel. The command-address signal CMD-ADD transferred between the memory controller 530 and the memory modules 603 and 730, and the data signal DATA transferred between the memory controller 530 and the memory modules 603 and 730 may be optical signals.

The polarization-controlled optical channel may control a polarization of transmission light in response to a plurality of selection signals SEL1 and SEL2 in order to transfer the transmission light to a target memory module among the memory modules 630 and 730. The transmission light is linearly-polarized light provided from the memory controller 530, and the selection signals SEL1 and SEL2 correspond to the memory modules 630 and 730, respectively. As described above, the polarization-controlled optical channel may include the optical waveguide coupled to the memory controller 530, and the selectors SL sequentially inserted along the optical waveguide. The selectors SL receive the selection signals SEL1 and SEL2, respectively, and the selectors SL are coupled to the memory modules 630 and 730, respectively.

The electrical channel is configured to transfer an electrical signal simultaneously to the memory modules 630 and 730. The polarization-controlled optical channel transfers the light signal from the memory controller 530 selectively to the target memory module among the memory modules 630 and 730.

In an example embodiment, the selection signals SEL1 and SEL2 may be provided from the memory controller 530 through the electrical channel included in the command-address bus CABUS. For example, the selection signals SEL1 and SEL2 for selecting one memory module may be provided with an active command to the memory modules 630 and 730 through the broadcasting optical channel. After the one selector SL is selected or enabled in response to the selection signals SEL1 and SEL2, the write data may be provided with a write command from the memory controller 530 through the polarization-controlled optical channel.

Figure 11:
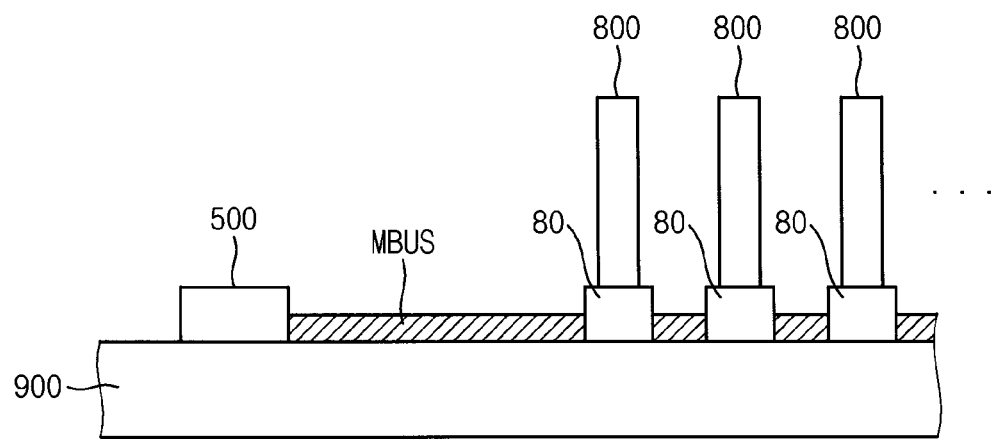
FIG. 11 is a diagram illustrating a system according to example embodiments.

FIG. 11 is a diagram illustrating a system according to example embodiments.

Referring to FIG. 11, a system 1500 may include a main board 900 such as a printed circuit board (PCB) and a memory system mounted on the main board 900. The memory system may include a memory controller 500, a plurality of memory modules 800, a memory bus MBUS connecting the memory controller 500 and the plurality of memory modules 800. The plurality of memory modules 800 may be connected to the memory bus MBUS detachably using sockets 80.

Even though only the memory system is illustrated in FIG. 11, various sub-systems may be mounted on the main board 900. The memory controller 500 may be included in an integrated circuit having various functions such as an application processor. The memory controller 500 and the plurality of memory modules 800 may include optical interfaces for performing optical communication, respectively.

The memory bus MBUS may include at least one polarization-controlled optical channel as described with reference to FIGS. 1 through 10. The polarization-controlled optical channel may control a polarization of transmission light in response to a plurality of selection signals to transfer the transmission light to a target memory module among the plurality of memory modules 800. The transmission light is linearly-polarized light provided from the memory controller 500, and the plurality of selection signals correspond to the plurality of memory modules 800, respectively.

As described above, the polarization-controlled optical channel may include an optical waveguide coupled to the memory controller 500, and selectors sequentially inserted along the optical waveguide. The selectors receive the plurality of selection signals, respectively, and the selectors are coupled to the memory modules 800, respectively. The optical waveguide may be formed inside the main board 90 or on the surface of the main board 900. When the optical waveguide is formed on the surface of the main board 900, the selectors may be formed inside the sockets 80.

Figure 12:
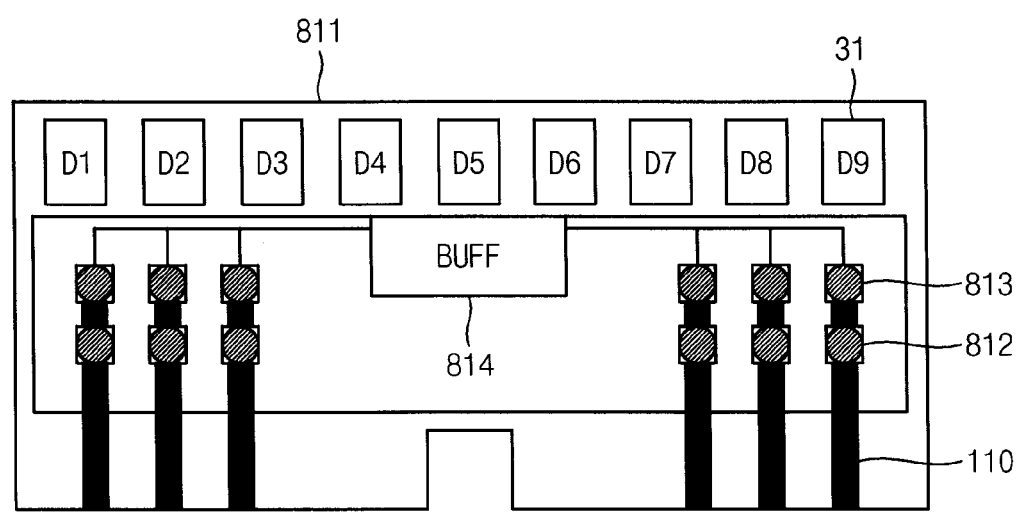
FIGS. 12 and 13 are diagrams illustrating an example of a memory module included in the system of FIG. 11.
Figure 13:
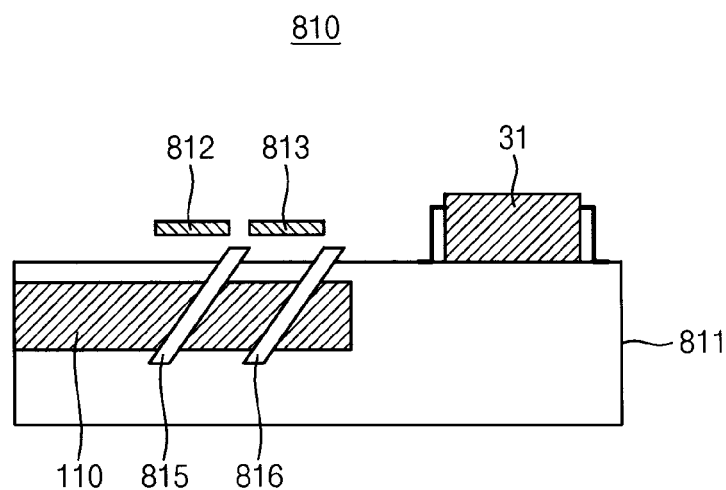

FIGS. 12 and 13 are diagrams illustrating an example of a memory module included in the system of FIG. 11.

Referring to FIGS. 12 and 13, a memory module 810 may include a plurality of memory devices (D1~D9) 31, a buffer (BUFF) 814 coupled to the memory devices 31, internal channels, a light source 812 and a photo-detector 813. The buffer 814 may correspond to the above-described electrical interface. The light source 812 and the photo-detector 813 may be included in the above-described optical interface. Each internal channel may include an internal optical waveguide 110, an input-output polarization beam splitter 815 and a reflector 816.

Even though nine memory devices 31 and six internal channels are illustrated in FIG. 12, the numbers of the memory device and the internal channels may be changed variously according to the design of the memory system. The memory device 31 may include a dynamic random access memory (DRAM), a mobile DRAM, a static random access memory (SRAM), a phase-change random access memory (PRAM), a ferromagnetic random access memory (FRAM), a resistive random access memory (RRAM), a magnetic random access memory (MRAM), etc.

The polarization-controlled optical channel in the memory bus of FIG. 11 may perform bidirectional communication between the memory controller 500 and the plurality of memory modules 800. Each memory module 810 illustrated in FIGS. 12 and 13 may include the interface for supporting the bidirectional communication.

The internal optical waveguide 110 connects the input-output polarization beam splitter 815 and the corresponding selector of the polarization-controlled optical channel in the memory bus MBUS. The photo-detector 813 receives the transmission light from the internal optical waveguide 110 through the input-output polarization beam splitter 815. For example, the transmission light may be passed by the input-output polarization beam splitter 815 and reflected by the reflector 816 in order to be transferred to the photo-detector 813. The light source 812 transmits reception light to the internal optical waveguide 110 through the input-output polarization beam splitter 815. The reception light may be reflected by the input-output polarization beam splitter 815 in order to be transferred to the internal optical waveguide 110.

As illustrated in FIGS. 12 and 13, the light source 812, the photo-detector 813 may be arranged in a line along the longitudinal direction of the internal optical waveguide 110. The input-output polarization beam splitter 815 and the reflector 816 may be disposed under the light source 812 and the photo-detector 813, respectively. According to example embodiments, the positions of the light source 812 and the photo-detector 813 may be changed. The polarizations of the transmission light and reception light, and the type of the input-output polarization beam splitter 815 may be determined properly depending on the configuration of the internal channel.

Figure 14:
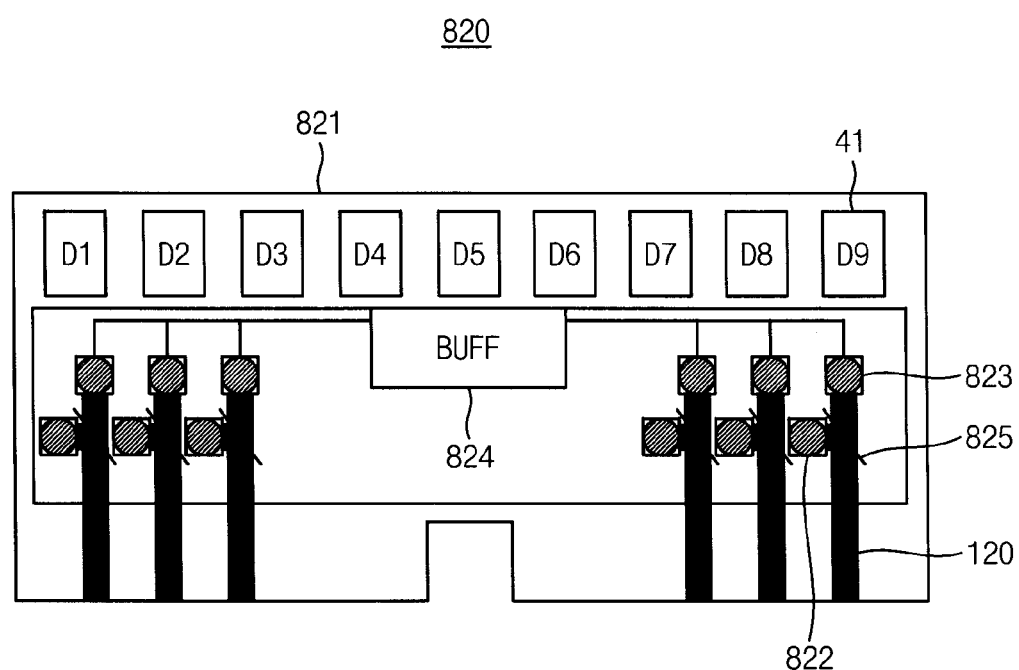
FIGS. 14 and 15 are diagrams illustrating another example of a memory module included in the system of FIG. 11.
Figure 15:
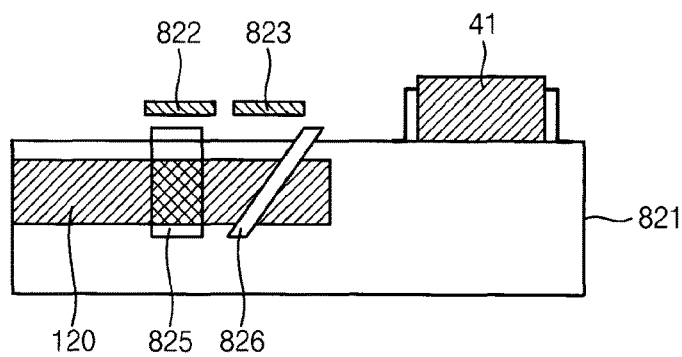

FIGS. 14 and 15 are diagrams illustrating another example of a memory module included in the system of FIG. 11.

Referring to FIGS. 14 and 15, a memory module 820 may include a plurality of memory devices (D1~D9) 41, a buffer (BUFF) 824 coupled to the memory devices 41, internal channels, a light source 822 and a photo-detector 823. The buffer 824 may correspond to the above-described electrical interface. The light source 822 and the photo-detector 823 may be included in the above-described optical interface.

Each internal channel may include an internal optical waveguide 120, an input-output polarization beam splitter 825 and a reflector 826.

Even though nine memory devices 41 and six internal channels are illustrated in FIG. 14, the numbers of the memory device and the internal channels may be changed variously according to the design of the memory system. The memory device 41 may include a dynamic random access memory (DRAM), a mobile DRAM, a static random access memory (SRAM), a phase-change random access memory (PRAM), a ferromagnetic random access memory (FRAM), a resistive random access memory (RRAM), a magnetic random access memory (MRAM), etc.

The polarization-controlled optical channel in the memory bus of FIG. 11 may perform bidirectional communication between the memory controller 500 and the plurality of memory modules 800. Each memory module 820 illustrated in FIGS. 14 and 15 may include the interface for supporting the bidirectional communication.

The internal optical waveguide 120 connects the input-output polarization beam splitter 825 and the corresponding selector of the polarization-controlled optical channel in the memory bus MBUS. The photo-detector 823 receives the transmission light from the internal optical waveguide 120 through the input-output polarization beam splitter 825. For example, the transmission light may be passed by the input-output polarization beam splitter 855 and reflected by the reflector 826 in order to be transferred to the photo-detector 823. The light source 822 transmits reception light to the internal optical waveguide 120 through the input-output polarization beam splitter 825. The reception light may be reflected by a reflector (not shown) under the light source 822 and by the input-output polarization beam splitter 815 in order to be transferred to the internal optical waveguide 120.

As illustrated in FIGS. 14 and 15, the photo-detector 813 may be disposed along the longitudinal direction of the internal optical waveguide 120, and the light source 811 may be disposed at a side of the internal optical waveguide 120. The reflectors may be disposed under the light source 822 and the photo-detector 823, respectively. According to example embodiments, the positions of the light source 822 and the photo-detector 823 may be changed and the polarizations of the transmission light and reception light, and the type of the input-output polarization beam splitter 825 may be determined properly depending on the configuration of the internal channel.

Figure 16:
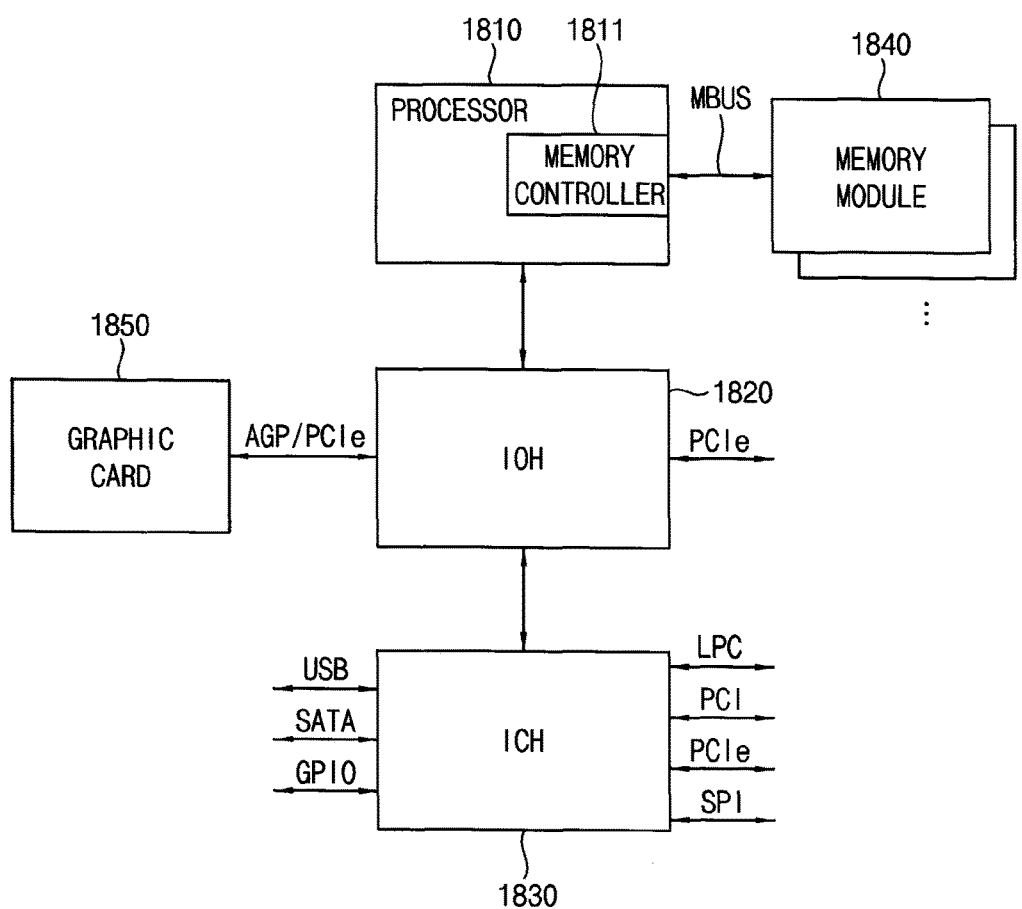
FIG. 16 is a block diagram illustrating a computing system including a memory system according to example embodiments.

FIG. 16 is a block diagram illustrating a computing system including a memory system according to example embodiments.

Referring to FIG. 16, a computing system 1800 includes a processor 1810, an input/output hub (IOH) 1820, an input/output controller hub (ICH) 1830, at least one memory module 1840 and a graphics card 1850. In some embodiments, the computing system 1800 may be a personal computer (PC), a server computer, a workstation, a laptop computer, a mobile phone, a smart phone, a personal digital assistant (PDA), a portable multimedia player (PMP), a digital camera, a digital television, a set-top box, a music player, a portable game console, a navigation system, etc.

The processor 1810 may perform various computing functions, such as executing specific software for performing specific calculations or tasks. For example, the processor 1810 may be a microprocessor, a central process unit (CPU), a digital signal processor, or the like. In some embodiments, the processor 1810 may include a single core or multiple cores. For example, the processor 1810 may be a multi-core processor, such as a dual-core processor, a quad-core processor, a hexa-core processor, etc. In some embodiments, the computing system 1800 may include a plurality of processors. The processor 1810 may include an internal or external cache memory.

The processor 1810 may include a memory controller 1811 for controlling operations of the memory module 1840. The memory controller 1811 included in the processor 1810 may be referred to as an integrated memory controller (IMC). A memory bus MBUS between the memory controller 1811 and the memory module 1840 may include at least one polarization-controlled optical channel according to example embodiments. The polarization-controlled optical channel may control a polarization of transmission light in response to a plurality of selection signals in order to transfer the transmission light to a target memory module among the memory modules 1840. The transmission light is linearly-polarized light provided from the memory controller 1811, and the plurality of selection signals correspond to the memory modules 1840, respectively. As described above, the polarization-controlled optical channel may include the optical waveguide coupled to the memory controller 1811, and a plurality of selectors sequentially inserted along the optical waveguide. The plurality of selectors receive the plurality of selection signals, respectively, and the plurality of selectors are coupled to the memory modules 1840, respectively.

In some embodiments, the memory controller 1811 may be located inside the input/output hub 1820, which may be referred to as memory controller hub (MCH). Each of the memory modules 1840 may include a plurality of memory devices to store data provided from the memory controller 1811.

The input/output hub 1820 may manage a data transfer between the processor 1810 and devices, such as the graphics card 1850. The input/output hub 1820 may be coupled to the processor 1810 via various interfaces. For example, the interface between the processor 1810 and the input/output hub 1820 may be a front side bus (FSB), a system bus, a HyperTransport, a lightning data transport (LDT), a QuickPath interconnect (QPI), a common system interface (CSI), etc. In some embodiments, the computing system 1800 may include a plurality of input/output hubs. The input/output hub 1820 may provide various interfaces with the devices. For example, the input/output hub 1820 may provide an accelerated graphics port (AGP) interface, a peripheral component interface-express (PCIe), a communications streaming architecture (CSA) interface, etc.

The graphics card 1850 may be coupled to the input/output hub 1820 via AGP or PCIe. The graphics card 1850 may control a display device (not shown) for displaying an image. The graphics card 1850 may include an internal processor for processing image data and an internal memory device. In some embodiments, the input/output hub 1820 may include an internal graphics device along with or instead of the graphics card 1850 outside the graphics card 1850. The graphics device included in the input/output hub 1820 may be referred to as integrated graphics. Further, the input/output hub 1820 including the internal memory controller and the internal graphics device may be referred to as a graphics and memory controller hub (GMCH).

The input/output controller hub 1830 may perform data buffering and interface arbitration to efficiently operate various system interfaces. The input/output controller hub 1830 may be coupled to the input/output hub 1820 via an internal bus, such as a direct media interface (DMI), a hub interface, an enterprise Southbridge interface (ESI), PCIe, etc. The input/output controller hub 1830 may provide various interfaces with peripheral devices. For example, the input/output controller hub 1830 may provide a universal serial bus (USB) port, a serial advanced technology attachment (SATA) port, a general purpose input/output (GPIO), a low pin count (LPC) bus, a serial peripheral interface (SPI), PCI, PCIe, etc.

In some embodiments, the processor 1810, the input/output hub 1820 and the input/output controller hub 1830 may be implemented as separate chipsets or separate integrated circuits. In other embodiments, at least two of the processor 1810, the input/output hub 1820 and the input/output controller hub 1830 may be implemented as a single chipset.

The components of the computing system 1800 may be implemented with various packages. For example, at least a portion of the components of the computing system 1800 may be mounted using packages such as Package on Package (PoP), Ball grid arrays (BGAs), Chip scale package (CSP), Plastic Leaded Chip Carrier (PLCC), Plastic Dual In-Line Package (PDIP), Die in Waffle Package, Die in Wafer Form, Chip On Board (COB), Ceramic Dual In-Line Package (CERDIP), Plastic Metric Quad Flat Package (MQFP), Thin Quad Flat Package (TQFP), Shrink Small Outline Package (SSOP), Thin Small Outline Package (TSOP), Thin Quad Flat Package (TQFP), System In Package (SIP), Multi Chip Package (MCP), Wafer-level Fabricated Package (WFP), Wafer-Level Processed Stack Package (WSP), etc.

As described above, the polarization-controlled optical channel and the memory system including the polarization-controlled optical channel according to example embodiments may reduce power consumption by performing point-to-point communication with the one selected slave device or the one selected memory module without dividing the power of the transmission light.

In addition, the polarization-controlled optical channel and the memory system including the polarization-controlled optical channel according to example embodiments may connect one slave device such as a memory module to a host device such as a memory controller, and thus interference noises may be reduced and reliability of the transferred signals may be enhanced.

Furthermore, the polarization-controlled optical channel and the memory system including the polarization-controlled optical channel according to example embodiments may perform the selection of the slave devices or the memory modules to reduce the latency of the memory system.

The present disclosure may be applied to systems such as a memory card, a solid state drive (SSD), a mobile phone, a smart phone, a personal digital assistant (PDA), a portable multimedia player (PMP), a digital camera, a music player, a portable game console, a navigation system, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A memory system, comprising:
    a memory controller;
    a plurality of memory modules; and
    a memory bus configured to connect the memory controller to each of the plurality of memory modules, the memory bus including at least one polarization-controlled optical channel configured to control a polarization of transmission light in response to a plurality of selection signals and configured to selectively transfer the transmission light to a target memory module among the plurality of memory modules in response to the selection signals,
    wherein the transmission light is linearly-polarized light provided from the memory controller,
    wherein each of the plurality of selection signals corresponds to a respective one memory module among the plurality of memory modules, and
    wherein the polarization-controlled optical channel includes:
        an optical waveguide coupled to the memory controller; and
        a plurality of selectors sequentially inserted along the optical waveguide, each of the plurality of selectors being configured to receive a respective one selection signal among the plurality of selection signals, and each of the plurality of selectors being coupled to a respective one memory module among the plurality of memory modules and to selectively transfer the transmission light to the respective one memory module in response to the respective one selection signal.

2. The memory system of claim 1, wherein one selection signal corresponding to the target memory module is activated, and the remaining selection signals are deactivated.

3. The memory system of claim 1, wherein each of the plurality of selectors includes:
    a polarization controller configured to select one of two orthogonal polarizations for the transmission light in response to the received selection signal; and
    a polarization beam splitter configured to transfer the transmission light from the polarization controller either to the next selector among the plurality of selectors or to the corresponding memory module among the plurality of memory modules depending on the selected polarization of the transmission light by the polarization controller.

4. The memory system of claim 3, wherein the polarization controller is configured to:
    rotate an original polarization of the transmission light by 90 degrees and output the transmission light having a rotated polarization when the received selection signal is activated; and
    maintain the original polarization of the transmission light and output the transmission light having the original polarization when the received selection signal is deactivated.

5. The memory system of claim 3, wherein the polarization beam splitter includes:
    a polarization prism configured to reflect the transmission light when the polarization of the transmission light from the polarization controller is orthogonal to an original polarization of the transmission light, and configured to pass the transmission light when the polarization of the transmission light from the polarization controller is parallel with the original polarization of the transmission light.

6. The memory system of claim 1, wherein each of the plurality selectors is configured to transfer an entire power of the transmission light either to the next selector among the plurality of selectors or to the corresponding memory module among the plurality of memory modules without dividing the entire power of the transmission light.

7. The memory system of claim 1, wherein the polarization-controlled optical channel is configured to perform bidirectional communication between the memory controller and each of the plurality of memory modules.

8. The memory system of claim 7, wherein each of the plurality of memory modules includes:
an input-output polarization beam splitter;
an internal optical waveguide configured to connect the input-output polarization beam splitter and the corresponding selector of the polarization-controlled optical channel;
a photo-detector configured to receive the transmission light from the internal optical waveguide through the input-output polarization beam splitter; and
a light source configured to transmit reception light to the internal optical waveguide through the input-output polarization beam splitter, the reception light being transferred to the memory controller.

9. The memory system of claim 1, wherein the memory bus includes:
a data bus implemented with the polarization-controlled optical channel; and
a command-address bus implemented with the polarization-controlled optical channel.

10. The memory system of claim 1, wherein the plurality of selection signals is transferred from the memory controller through a module selection channel that is different from the polarization-controlled optical channel.

11. The memory system of claim 1, wherein the memory bus includes:
a data bus implemented with the polarization-controlled optical channel; and
a command-address bus implemented with a broadcasting optical channel that is configured to transfer an optical signal simultaneously to the plurality of memory modules.

12. The memory system of claim 11, wherein the plurality of selection signals is transferred from the memory controller through the broadcasting optical channel.

13. The memory system of claim 1, wherein the memory bus includes:
a data bus implemented with the polarization-controlled optical channel; and
a command-address bus implemented with an electrical channel.

14. A polarization-controlled optical channel, comprising:
an optical waveguide configured to selectively transfer transmission light to a plurality of slave devices, the transmission light being linearly-polarized light provided from a host device; and
a plurality of selectors sequentially inserted along the optical waveguide, the plurality of selectors being configured to control a polarization of the transmission light in response to a plurality of selection signals and configured to selectively transfer the transmission light to a target slave device among the plurality of slave devices based on the controlled polarization in response to the selection signals,
wherein each of the plurality of selection signals corresponds to a respective one slave device among the plurality of slave devices, and
wherein each of the plurality of selectors is configured to receive a respective one selection signal among the plurality of selection signals, and each of the plurality of selectors is coupled to the respective one slave device among the plurality of slave devices which corresponds to the one selection signal and is configured to selectively transfer the transmission light to the respective one slave device in response to the respective one selection signal.

15. The polarization-controlled optical channel of claim 14, wherein each of the plurality of selectors includes:
a polarization controller configured to select one of two orthogonal polarizations for the transmission light in response to the received selection signal; and
a polarization beam splitter configured to transfer the transmission light from the polarization controller either to the next selector among the plurality of selectors or to the corresponding slave device among the plurality of slave devices depending on the selected polarization of the transmission light by the polarization controller.

16. The polarization-controlled optical channel of claim 15, wherein the polarization controller is configured to:
rotate an original polarization of the transmission light by 90 degrees and output the transmission light having a rotated polarization when the received selection signal is activated; and
maintain the original polarization of the transmission light and output the transmission light having the original polarization when the received selection signal is deactivated.

17. A portable device, comprising:
a processor including a memory controller;
an input/output hub coupled to the processor;
an input/output controller hub coupled to the input/output hub;
a plurality of memory modules;
a memory bus disposed between the memory controller and the plurality of memory modules, the memory bus including at least one polarization-controlled optical channel; and
a graphics card,
wherein the at least one polarization-controlled optical channel is configured to control a polarization of transmission light in response to a plurality of selection signals and to selectively transfer the transmission light to a target memory module among the at least one memory module based on the controlled polarization in response to the selection signals, and
wherein the polarization-controlled optical channel includes:
an optical waveguide coupled to the memory controller; and
a plurality of selectors sequentially inserted along the optical waveguide, each of the plurality of selectors being configured to receive a respective one selection signal among the plurality of selection signals, and each of the plurality of selectors being coupled to a respective one memory module among the plurality of memory modules and to selectively transfer the transmission light to the respective one memory module in response to the respective one selection signal.

18. The portable device of claim 17, wherein each of the plurality of memory modules includes:
- a plurality of memory devices;
- a buffer coupled to the plurality of memory devices;
- a plurality of internal channels, each of the plurality of internal channels including an internal optical waveguide, an input-output polarization beam splitter and a reflector;
- a light source configured to transmit reception light to the internal optical waveguide through the input-output polarization beam splitter; and
- a photo detector configured to receive the transmission light from the internal optical waveguide through the input-output polarization beam splitter,
- wherein the reception light is reflected by the input-output polarization beam splitter.

19. The portable device of claim 18, wherein each of the plurality of memory modules includes an interface that is configured to support bidirectional communication with the memory controller.

\* \* \* \* \*